(12) United States Patent
Ehrstrom et al.

(10) Patent No.: US 7,087,317 B2
(45) Date of Patent: Aug. 8, 2006

(54) COMPOSITE LAMINATED ALUMINUM-GLASS FIBER SANDWICH PANELS

(75) Inventors: Jean-Christophe Ehrstrom, Echirolles (FR); Timothy Warner, Voreppe (FR)

(73) Assignee: Alcan Rhenalu, Paris (FR)

( * ) Notice: Subject to any disclaimer, the term of this patent is extended or adjusted under 35 U.S.C. 154(b) by 153 days.

(21) Appl. No.: 10/669,502

(22) Filed: Sep. 25, 2003

(65) Prior Publication Data

US 2005/0037188 A1 Feb. 17, 2005

(30) Foreign Application Priority Data

Sep. 25, 2002 (FR) .................................. 02 11841

(51) Int. Cl.
*B32B 15/04* (2006.01)
*B32B 15/08* (2006.01)
*B32B 15/20* (2006.01)

(52) U.S. Cl. ..................... 428/650; 428/332; 428/416; 428/457; 428/626; 428/650; 428/654; 244/119; 244/133

(58) Field of Classification Search ................ 428/650, 428/654, 649, 220, 457, 416, 626, 332; 244/133, 244/119
See application file for complete search history.

(56) References Cited

U.S. PATENT DOCUMENTS

| 4,082,578 A | * | 4/1978 | Evancho et al. ............. 148/535 |
| 4,489,123 A | | 12/1984 | Schijve et al. |
| 4,657,717 A | | 4/1987 | Cattanach et al. |
| 5,039,571 A | | 8/1991 | Vogelesang et al. |
| 5,219,629 A | * | 6/1993 | Sobolev ..................... 428/35.9 |
| 5,547,735 A | | 8/1996 | Roebroeks et al. |
| 6,224,992 B1 | * | 5/2001 | Delbeke et al. ............. 428/654 |
| 6,696,106 B1 | * | 2/2004 | Schultz et al. .............. 427/496 |

FOREIGN PATENT DOCUMENTS

WO WO 98/53989 12/1998

\* cited by examiner

*Primary Examiner*—Michael E. Lavilla
(74) *Attorney, Agent, or Firm*—Baker Donelson Bearman Caldwell & Berkowitz PC

(57) ABSTRACT

A Glare type composite laminated sandwich panel comprising (i) aluminum (ii) glass fibre with adhesive (iii) aluminum is disclosed. According to the present invention, at least one of the aluminum sheets is preferably made of an aluminum non-heat treatable alloy type Al—Mg with a magnesium content of between 4 and 6%. These sandwich panels have mechanical characteristics similar to sandwich panels comprising sheets with a heat treatable alloy. Panels of the present invention further generally have better corrosion resistance and are less expensive than those made with heat treatable alloys such as 2xxx and 7xxx type alloys.

66 Claims, 1 Drawing Sheet

COMPOSITE LAMINATED ALUMINUM-GLASS FIBER SANDWICH PANELS

CROSS REFERENCE TO RELATED APPLICATIONS

This application claims priority under 35 U.S.C. §119 to French Patent Application No. 02 11841, filed Sep. 25, 2002 which is incorporated herein by reference in its entirety.

BACKGROUND OF THE INVENTION

1. Field of the Invention

The present invention relates generally to composite laminated sandwich panels comprised of the following layers (i) aluminum—(ii) glass fibre with adhesive—(iii) aluminum. These panels include those known under the generic name "Glare." The present invention is further directed to the use of such composite laminated sandwich panels in aeronautical construction, and particularly as a fuselage skin.

2. Description of Related Art

Laminated aluminum—organic polymer-based fibre—aluminum composites have been known for a long time. The organic polymers are typically polyamides or polyesters. For example, EP 0 056 288 B1 and EP 0 056 289 B1 (Technische Hogeschool Delft) disclose a laminated material including two thin sheets of heat treated aluminum (particularly alloy 2024 T3 and alloy 7075 T6) surrounding an adhesive layer, in which polyparaphenylene—terephthalamide (PPDT) fibres with a high modulus of elasticity (between 50 GPa and 250 GPa) are embedded. Several alternating layers of organic material and aluminum may be superposed in this way. This type of organic fibre-based material cannot be used at high temperatures, typically above 120° C. to 130° C., for prolonged periods. Furthermore, it is difficult to control residual stresses in these composite laminated sandwich panels.

EP 0 312 150 B1 (Structural Laminates Company) discloses the use of carbon, aramide, polyethylene or glass fibres in the form of continuous filaments running parallel to each other in at least one direction. These fibres are impregnated with a thermoplastic adhesive. The composite laminated sandwich panels or panels are prestressed.

EP 0 323 60 A1 (Akzo Nobel) discloses a process for manufacturing structural elements for an aircraft fuselage including composite laminated sandwich panels using thermosetting resins, and particularly epoxy resins. Those skilled in the art would denote these composite laminated sandwich panels by the generic name "Glare".

U.S. Pat. No. 5,547,735 (Structural Laminates Company) describes the use of sheets made of 5052 alloy in composite laminated complexes. U.S. Pat. No. 4,657,717 (Alcan International) describes the use of superplastic sheets in a laminated complex. WO 98/53989 (Akzo Nobel) discloses a process for making composite laminated sandwich panels including sheets made of aluminum, copper, magnesium, steel or titanium-base alloys. The preferred types of alloys are 2×24 T3 and 7×75 T6 type alloys.

The state of the art, manufacturing processes, characteristics and applications of Glare type laminated aluminum—glass fibre complexes are summarised in the article "Fibre Metal Laminates for High Capacity Aircraft", by A. Vlot, L. B. Vogelesang and T. J. de Vries, 30th International SAMPE Technical Conference, Oct. 20–24, 1998, pages 456–470, as well as in the article "The Residual Strength of Fibre Metal Laminates: Glare 2 and Glare 3", by C. A. J. R. Vermeeren, 30th International SAMPE Technical Conference, Oct. 20–24, 1998, pages 471–482, both of which are incorporated herein by reference in their entireties.

The term "heat treatable alloy" is defined for aluminum in standard EN 12258-1 as being an "alloy that can be hardened by an appropriate heat treatment". The opposite term "non-heat treatable alloy" is defined in the same standard as being an "alloy that cannot be substantially hardened by heat treatment". Heat treatable alloys include alloys in the 2xxx, 7xxx and 6xxx series, while alloys in the 5xxx and 3xxx series are non-heat treatable alloys.

Typically, composite laminated sandwich panels according to the state of the art comprise N thin sheets made of heat treatable aluminum alloy alternating with N-1 sheets of epoxy resin reinforced with glass fibres. The reinforced epoxy resin sandwich panels are sometimes called "prepregs". In such assemblies, the aluminum sheets form the outside faces of the composite laminated and alternate with glass fibre reinforced resin sheets. Heat treatable alloys used are alloys typically belonging to the 2xxx or 7xxx families, and more particularly the 2024 alloy in the T3 state. The thickness of the said thin aluminum alloy sheets is typically of the order of 0.1 mm to 0.6 mm. The outside sheet of the laminated complex is normally a clad plate. A clad plate is utilized in order to minimize corrosion of the outside face. The total thickness of the laminated complex depends on the application. The thickness can be on the order of about 3 mm for a fuselage skin, while a thickness on the order of about 20 mm may be necessary for a skin stiffener for an aircraft door (see article by B. Isink "Mit Glare 'erleichtert' abheben", published in the Airbus News Review, Nov. 1, 2001, incorporated herein by reference in its entirety).

There are some disadvantages with these composite laminated sandwich panels according to the state of the art. First, thin heat treatable aluminum sheets are expensive because their manufacturing process is complex. Furthermore, most alloys in the 2xxx and 7xxxx families, and particularly those alloys in the 2xxx and 7xxx families that are used for making structural elements for aeronautical applications, are sensitive to corrosion. This is why clad sheets are used as the outside face of the structural element when this sensitivity to corrosion is a problem.

In general, conducting a heat treatment on a thin sheet is difficult, since a thin sheet can deform, particularly during quenching. Thus, if a heat treatment is to be conducted, corrective measures are made that require additional steps in the process, for example smoothing, flattening or controlled tension.

Conducting a heat treatment of thin clad sheets is even more difficult, since some chemical elements in the core can diffuse into the cladding at high temperature. For example, if the copper content in a 2xxx alloy such as 2024 enters the cladding layer, this layer will no longer satisfactorily play its intended corrosion protection role and can be attacked by the environment. Furthermore, since a cladding layer is mechanically weak, thin clad sheets must be handled with care to prevent surface scratches that could become corrosion sites. Consequently, thin clad sheets are significantly more expensive to make, and moreover produce a higher scrap rate during their manufacture than with non-clad sheets made of the same alloy and with the same thickness and metallurgical temper. This further increases their cost to manufacture and ultimately their final sales price to customers. The problem of being susceptible to scratching continues even after a Glare type laminated complex is manufactured. That is, if an accidental scratch causes an unacceptable defect during manipulation of such a complex, the part has to be scrapped. As such the entire costs associated with the manufacture of the scrapped laminated complex is lost.

Therefore, it would be desirable to have composite laminated aluminum—glass fibre sandwich panels that use thin aluminum alloy sheets that can be made using a simpler and more reliable and cost effective manufacturing process than the traditional processes described above that have been previously utilized with thin sheets made from the 2xxx and 7xxx alloys. More particularly, it would be desirable for the thin plates to be less sensitive to corrosion than thin plates made with 2xxx or 7xxx type alloys, and for composite laminated sandwich panels made using these plates to have mechanical characteristics comparable to the characteristics of known composite laminated sandwich panels.

SUMMARY OF THE INVENTION

An object of the present invention was therefore to provide a laminated aluminum—glass fibre composite sandwich panel comprising N sheets or plates of aluminum alloy metal alternating with N-1 layers of polymer, where N is equal to at least 2 and the said polymer layer contains glass fibres. At least one of the said sheets or plates is an aluminum non-heat treatable Al—Mg alloy having a magnesium content of between about 4 and about 6%.

Another object of the present invention is to provide uses of such a sandwich panel as a structural element, particularly in aeronautical construction.

Another object of the present invention was to prepare a structural element comprising at least one sandwich panel.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWING

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF A PREFERRED EMBODIMENT

Figure 1:
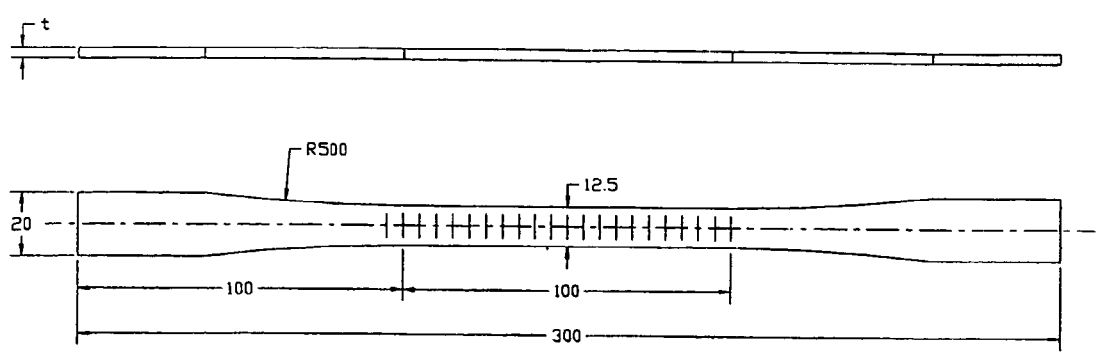
FIG. 1 shows two diagrammatic views of a test piece used to determine the static mechanical characteristics of composite laminated sandwich panels according to the present invention.

Unless mentioned otherwise, all information about the chemical composition of alloys is expressed in percent mass. The designation of alloys follows the rules of The Aluminum Association. Metallurgical states are defined in European standard EN 515. Unless mentioned otherwise, the static mechanical properties, in other words, the ultimate tensile strength $R_m$, the tensile yield strength $R_{p0.2}$, and the elongation at failure A, of metal sheets or plates were determined by a tensile test according to standard EN 10002-1. In this disclosure, the term "sheet" in the context of aluminum materials is understood as being a rolled aluminum alloy product with a uniform thickness of less than 6 mm, while standard EN 12258-1 uses the term "foil" for rolled products with a thickness less than or equal to 0.20 mm. The term "plate" is to be given its ordinary meaning as known to those of skill in the art.

The applicant has observed that composite laminated sandwich panels of the present invention can be made using any desired type of non-heat treatable Al—Mg aluminum alloy sheets, having a preferred a magnesium content between about 4 and about 6%. The term "about" is intended to cover any amounts of magnesium below 4% and above 6% wherein novel properties of the present are still present. The applicant has observed that the tensile yield strength and the mechanical strength of Glare type composite laminated sandwich panels increase approximately linearly with the tensile yield strength and the ultimate tensile strength of the base metal sheet. For metal sheets with a very high tensile yield strength (i.e. above about 240 MPa), the tensile yield strength of Glare type composite laminated sandwich panels is undoubtedly lower than the tensile yield strength of the metal sheets, but it continues to increase with the tensile yield strength of the base metal sheets.

However, for some technical applications, the tensile yield strength and the ultimate tensile strength are not of overriding importance, provided that they are equal to a certain minimum level, the numerical value of which depends on the planned use of the material. This is the case particularly for a structural element in which cracks of a certain maximum size can be tolerated in service. For example, when a composite laminated sandwich panels is to be used as a skin panel for an aircraft fuselage, the residual strength of a cracked panel is an important parameter that determines the choice of the composite to be used.

All non-heat treatable aluminum alloys of the Al—Mg type with a magnesium content of between 4 and 6% preferably have a sufficiently high tensile yield strength, ultimate yield strength and fracture toughness to be useful in one or more desired applications. Furthermore, for manufacturing of composite laminated sandwich panels that will be useful as a structural element in aeronautical construction, it is preferred to use metal sheets or plates with the following static mechanical characteristics: a tensile yield strength equal to at least 240 MPa and preferably at least 260 MPa, an ultimate tensile strength equal to at least 260 MPa and preferably at least 275 MPa. Even more preferably the toughness of the sheets is characterised by an apparent stress intensity factor $K_{CO}$, measured according to the ASTM E 561 standard on a 400 mm wide panel with an initial crack length of 133 mm, equal to at least about 75 MPa$\sqrt{m}$, advantageously in addition to the static mechanical properties mentioned supra. In one embodiment of the invention, the value $K_{CO}$ of the sheet is equal to at least 80 MPa$\sqrt{m}$, and even better at least 85 MPa$\sqrt{m}$.

Al—Mg alloys having a magnesium content of between about 4 and about 6% are preferred as these alloys generally have high mechanical strength and can be manufactured to have sufficient resistance to corrosion to be useful in aeronautical applications and products. Even more preferably, the manganese content of these sheets is between about 0.2 and about 1%.

For example, the applicant has obtained panels according to the invention using sheets made of an 5186 H12 alloy with a tensile yield strength of at least 250 MPa, which have a residual strength and a limit load comparable to panels using sheets made of 2024 T3 alloy. Even stronger type 5xxx alloys, or alloys in more extensively strain-hardened metallurgical states such as for example, H16, H18, H19, can advantageously be used if desired for any reason. Sheets in only slightly strain-hardened states can also be used if desired (preferably not more than H14), for example, if the intrinsic toughness of more severely strain-hardened sheets is not sufficient. It is preferable to use sheets that are sufficiently tough and have a sufficiently high ultimate tensile strength. The chemical composition and/or the degree of work hardening of the sheets can be adjusted to achieve the desired toughness and/or strength.

The applicant has observed that it may be preferable in some embodiments to optimise the static and dynamic mechanical characteristics of the basic sheet by varying its chemical composition and its microstructure rather than the strain-hardening. For example, the addition of scandium or hafnium can often increase the tensile yield strength of sheets above 300 MPa; the tensile yield strength of the sheet can thus be as high as 330 MPa, and preferably 350 MPa, or even more without degrading their intrinsic toughness. One preferred embodiment of the invention uses between 0.1 and 0.3%, and preferably about 0.2% of scandium, and/or between 0.2 and 0.4% and preferably about 0.3% of hafnium, knowing that these two elements can mutually replace each other, considering the greater efficiency of scandium than hafnium. One or more elements that form hardening dispersoids such as Zr, Cr, La, Ti, Ce, Nd, Eu, Gd, Tb, Dy, Ho, Er, Y and/or Yb can also optionally be used if desired for any reason. It is preferred that the concentration of each of the said elements does not exceed 0.5%, and the total concentration of the dispersoid elements, if used, should advantageously not exceed 2%. Thus, products with mechanical properties similar to those of standard products, (i.e. Glare-type composite laminated sandwich panels incorporating 2024 T3 thin plates), can be obtained without using metal sheets that have been subjected to structural hardening, and/or without using clad sheets.

The applicant has obtained surprisingly good results with sheets made of 5186, 5182, 5082, 5083, 5086, 5383 and 5456 alloys; however, any Al—Mg plate or sheet can be used if desired. Products made with 5186 H14, H16 and H28 sheets are preferred in some embodiments. In particular; the sheets of the present invention preferably have a value of $K_{co}$ equal to at least 80 MPa$\sqrt{m}$, and particularly preferably at least 85 MPa$\sqrt{m}$. The applicant has also obtained good results with sheets made of 5383 alloy in the H116 temper ($K_{CO}$ greater than 85 MPa$\sqrt{m}$). As a comparison, the value of $K_{CO}$ of a 2024 alloy sheet is of the order of 85 to 90 MPa$\sqrt{m}$. That is, the $K_{CO}$ (as well as the UTS and TYS) of sheets of the present invention in some embodiments are preferably substantially the same (i.e. within about 12%) as the $K_{CO}$ (and/or UTS and TYS) of 2024 alloy sheets.

According to certain embodiments of the present invention, laminated aluminum—glass fibre complexes can also be made in which one or both of the outer sheets is (are) made of a non-heat treatable alloy, while the other sheets are optionally made of heat treatable alloys. For example, this type of complex may comprise an outer sheet, for example, made of a 5186 H14 alloy, while the other sheets are made of any desired material such as a traditional 2024 T3 alloy. Thus, a clad heat treatable sheet can be replaced by a clad non-heat treatable sheet with similar mechanical characteristics.

Another advantageous embodiment of the invention involves the use of cold rolled 5182 or 5186 alloy sheets, typically in the H111 or H24 temper, with a typical thickness of between 0.2 and 0.4 mm.

Composite laminated sandwich panels according to the invention preferably comprise N aluminum alloy sheets alternating with N-1 layers of polymer; where N is equal to at least 2, but a value of 3 or 4 is preferred to the value of 2. They may be made using processes known to those skilled in the art. Any desired polymer can be employed including those known to those of skill in the art and as well as any similar or dissimilar but useful materials developed hereafter. A thermosetting polymer will be used in preference, for example an epoxy type polymer as known in the art. The thickness of sheets in composite laminated sandwich panels according to the invention can be any desired thickness and is advantageously less than 1 mm and is preferably between 0.2 and 0.6 mm. In some cases, it may be less than 0.2 mm, or even less than 0.1 mm as desired.

Products according to the invention can be used in any desired application such as for structural elements, particularly in aeronautical construction. One preferred application is for use as an aircraft structural element, particularly for such structural elements that have been designed or otherwise designated to tolerate the presence of cracks up to a certain maximum size in service situations. One particularly preferred application is for use as a skin panel for the upper shell of an aircraft. Another application is an element of an aircraft door. Any aeronautical construction can potentially be prepared using one or more panels according to the present invention as well as any other applications that may or may not have similar end use requirements.

Products according to the invention have many advantages. For example, the price of sheets (or plates) made of a non-heat treatable alloy is significantly lower than the price of sheets made of heat treatable alloys. The fact that sheets made of 5xxx alloy have better corrosion resistance as compared with 2024 sheets simplifies or potentially even eliminates the use of anti-corrosion surface treatments of external faces. Furthermore, panels of the present invention accept a thinner and lighter surface coating (for example paint or other exterior application). Thus, by employing products of the present invention, it is possible to make lighter, less expensive structural elements that utilize less polluting processes.

The following example is intended as exemplary and does not limit the invention.

EXAMPLE

Glare type composite laminated sandwich panels were prepared incorporating four identical 0.5 mm thick metal sheets and three glass fibre and epoxy adhesive layers ("prepreg" layers) with an identical thickness of 0.25 mm. Each of the three prepreg layers contains fibres superposed in the 0° and 90° directions. The width of the panels is 800 mm and their length was 1200 mm.

The metal sheets were thoroughly cleaned to remove all metallic and non-metallic particles. The composite was prepared using a known technique. The composite was baked in an autoclave with a temperature cycle defined by the following points:

$(t_1=0$ min/$T_1=20°$ C./$P_1=1000$ mbars), $(t_2=10$ min/$T_2=20°$ C./$P_2=6000$ mbars), $(t_3=55$ min/$T_3=120°$ C./$P_3=6000$ mbars), $(t_4=145$ min/$T_4=120°$ C./$P_4=6000$ mbars), ($t_5$=161 min/$T_5$=40° C./$P_5$=6000 mbars), ($t_6$=165 min/$T_6$=20° C./$P_6$=1000 mbars).

Composite laminated sandwich panels were thus prepared with non-clad sheets made of different alloys and in different metallurgical tempers, namely, 5186 H12, 2024 T3, 2024A T3 and 2024A T39. The static mechanical characteristics of these base metal sheets were determined according to standard EN 10002-1.

The static mechanical characteristics of the composite laminated sandwich panels along the direction parallel to the rolling direction of the sheets, and in the direction perpendicular to the rolling direction of the sheets, were determined using the procedure described in ASTM standard D 3039-76. The principle of the test pieces is shown in FIG. 1. FIG. 1 shows two diagrammatic views of a test piece used to determine the static mechanical characteristics of composite laminated sandwich panels according to standard ASTM D 3039-76. The parameter "t" indicates the sandwich panel thickness. The dimensions are given in millimetres.

The parameters measured were the tensile yield strength $R_{p0.2}$ (also designated TYS) and the ultimate tensile strength $R_m$ (also designated UTS).

A residual resistance test was conducted on a cracked panel according to ASTM standard E-561. These measures were interpreted according to the information given in the book by T. J. de Vries, "Blunt and sharp notch behaviour of Glare laminates", Delft University Press 2001, pages 59 to 68, incorporated herein by reference in its entirety. This book also provides information about the precise shape of the test piece.

Table 1 shows the results. The static mechanical characteristics given are the average values of five individual measurements.

TABLE 1

Results

| | Base metal sheet | | Composite laminated sandwich panels | | |
|---|---|---|---|---|---|
| Reference | $R_{p0.2}$ (L) [MPa] | $R_m$ (L) [MPa] | $R_{p0.2}$ (L) [MPa] | $R_m$ (L) [MPa] | Residual strength (L) [MPa√m] |
| 2024 T3 | 369 | 484 | 307 | 634 | 195 |
| 5186 H12 | 250 | 310 | 227 | 552 | 172 |
| 2024A T3 | 360 | 460 | 288 | 613 | 219 |
| 2024A T39 | 390 | 480 | 312 | 634 | 218 |

It can be seen that the residual strength of panels according to the invention made using sheets of 5186 H12 alloy is very similar to the residual strength of panels using sheets made of 2024 T3 alloy; that is, the residual strength is about 12% lower for panels according to the invention, which is acceptable considering all the other technical and economic advantages of products according to the invention.

The corrosion resistance of the panels was not tested in this example. Sheets made of 2xxx alloy were not clad to simplify manufacturing of composite laminated sandwich panels. Those skilled in the art know that the corrosion resistance of a product made of a 2xxx series alloy such as 2024 when used in standard situations such as a structural element of an aircraft, is very much less than the corresponding value of an alloy in the 5xxx series such as 5186 (for example, see the chapter "Corrosion Resistance of Aluminum and Aluminum Alloys" in Metal Handbook, Desk Edition, 2nd Edition, pages 499 to 505, ASM International), the content of which is incorporated herein by reference in its entirety.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

As used herein and in the following claims, articles such as "the", "a" and "an" can connote the singular or plural. As used in the following claims, the term "sheet" can refer to a sheet or a plate as understood to those of skill in the art.

All documents referred to herein are specifically incorporated herein by reference in their entireties.

The invention claimed is:

1. A composite laminated sandwich panel which has two external faces, comprising:
   N metal sheet layers comprising an aluminum non-heat treatable Al—Mg alloy having a magnesium content of from 4% to 6% based on the weight of alloy, said N metal sheet layers being the same or different, and
   N-1 polymer layers alternating in said sandwich panel with said metal sheet layers, wherein N is equal to at least 2, and each of said polymer layers comprises glass fibers.

2. A composite laminated sandwich panel according to claim 1, wherein N is at least 3.

3. A composite laminated sandwich panel according to claim 1, wherein at least one of the two external faces of said composite laminated sandwich panel comprises an aluminum non-heat treatable alloy sheet.

4. A composite laminated sandwich panel according to claim 1, wherein said aluminum non-heat treatable Al—Mg alloy is selected from the group consisting of 5082, 5083, 5182, 5086, 5383, 5456, and 5186 alloys.

5. A composite laminated sandwich panel according claim 1, wherein at least one of said Al—Mg alloy sheets comprises a 5182 or 5186 alloy in the H111 or H24 temper, and the thickness of said at least one Al—Mg alloy sheet is between 0.2 and 0.4 mm.

6. A composite laminated sandwich panel according to claim 1, wherein the manganese content of the Al—Mg alloy is between 0.2 and 1% based on the weight of the alloy.

7. A composite laminated sandwich panel according to claim 6, wherein the scandium content of the Al—Mg alloy is between 0.1 and 0.3% and/or the hafnium content is between 0.2 and 0.4%, all based on the weight of the alloy.

8. A composite laminated sandwich panel according to claim 1, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

9. A composite laminated sandwich panel according to claim 2, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

10. A composite laminated sandwich panel according to claim 3, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

11. A composite laminated sandwich panel according to claim 4, wherein the Al—Mg alloy in at least one sheet further comprises at least one element forming dispersoids, said element being selected the group consisting of Zr, Cr, La, Ti, Ce, Nd, Eu, Gd, Tb, Dy, Ho, Er, Y and Yb.

12. A composite laminated sandwich panel according to claim 5, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

13. A composite laminated sandwich panel according to claim 6, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

14. A composite laminated sandwich panel according to claim 7, wherein the Al—Mg alloy further comprises at least one element forming dispersoids, said element being selected the group consisting of Zr, Cr, La, Ti, Ce, Nd, Eu, Gd, Tb, Dy, Ho, Er, Y and Yb.

15. A composite laminated sandwich panel according to claim 1, wherein at least one of said metal sheets has a tensile yield strength of at least about 240 MPa, and an ultimate tensile strength of at least about 260 MPa.

16. A composite laminated sandwich panel according to claim 15, wherein said tensile yield strength is at least 260 MPa and an ultimate tensile strength of at least about 275 MPa.

17. A composite laminated sandwich panel according to claim 7, wherein at least one of said metal sheets has a tensile yield strength of at least about 300 MPa.

18. A composite laminated sandwich panel according to claim 7, wherein at least one of said metal sheets has a tensile yield strength of at least about 330 MPa.

19. A composite laminated sandwich panel according to claim 15, wherein at least one of said metal sheets has an apparent stress intensity factor equal to $K_{CO}$, measured according to the ASTM E 561 standard on a 400 mm wide panel with an initial crack of 133 mm, equal to at least about 75 MPa$\sqrt{m}$.

20. A panel according to claim 19 wherein the apparent stress intensity factor is at least 80 MPa$\sqrt{m}$.

21. A panel according to claim 19, wherein the apparent stress intensity factor is at least about 85 MPa$\sqrt{m}$.

22. A structural element comprising a composite laminated sandwich panel according to claim 1.

23. A structural element comprising a composite laminated sandwich panel according to claim 2.

24. A structural element comprising a composite laminated sandwich panel according to claim 3.

25. A structural element comprising a composite laminated sandwich panel according to claim 4.

26. A structural element comprising a composite laminated sandwich panel according to claim 5.

27. A structural element comprising a composite laminated sandwich panel according to claim 6.

28. A structural element comprising a composite laminated sandwich panel according to claim 7.

29. A structural element comprising a composite laminated sandwich panel according to claim 8.

30. A structural element comprising a composite laminated sandwich panel according to claim 9.

31. A structural element comprising a composite laminated sandwich panel according to claim 10.

32. A structural element comprising a composite laminated sandwich panel according to claim 11.

33. A structural element comprising a composite laminated sandwich panel according to claim 12.

34. A structural element comprising a composite laminated sandwich panel according to claim 13.

35. A structural element comprising a composite laminated sandwich panel according to claim 14.

36. A structural element comprising a composite laminated sandwich panel according to claim 15.

37. A structural element comprising a composite laminated sandwich panel according to claim 16.

38. A structural element comprising a composite laminated sandwich panel according to claim 17.

39. A structural element comprising a composite laminated sandwich panel according to claim 18.

40. A structural element comprising a composite laminated sandwich panel according to claim 19.

41. A structural element comprising a composite laminated sandwich panel according to claim 20.

42. A structural element comprising a composite laminated sandwich panel according to claim 21.

43. A structural element as claimed in claim 22, wherein said structural element is suitable or otherwise used in aeronautical construction.

44. A structural element as claimed in claim 23, wherein said structural element is suitable or otherwise used in aeronautical construction.

45. A structural element as claimed in claim 24, wherein said structural element is suitable or otherwise used in aeronautical construction.

46. A structural element as claimed in claim 25, wherein said structural element is suitable or otherwise used in aeronautical construction.

47. A structural element as claimed in claim 26, wherein said structural element is suitable or otherwise used in aeronautical construction.

48. A structural element as claimed in claim 27, wherein said structural element is suitable or otherwise used in aeronautical construction.

49. A structural element as claimed in claim 28, wherein said structural element is suitable or otherwise used in aeronautical construction.

50. A structural element as claimed in claim 29, wherein said structural element is suitable or otherwise used in aeronautical construction.

51. A structural element as claimed in claim 30, wherein said structural element is suitable or otherwise used in aeronautical construction.

52. A structural element as claimed in claim 31, wherein said structural element is suitable or otherwise used in aeronautical construction.

53. A structural element as claimed in claim 32, wherein said structural element is suitable or otherwise used in aeronautical construction.

54. A structural element as claimed in claim 33, wherein said structural element is suitable or otherwise used in aeronautical construction.

55. A structural element as claimed in claim 34, wherein said structural element is suitable or otherwise used in aeronautical construction.

56. A structural element as claimed in claim 35, wherein said structural element is suitable or otherwise used in aeronautical construction.

57. A structural element as claimed in claim 36, wherein said structural element is suitable or otherwise used in aeronautical construction.

58. A structural element as claimed in claim 37, wherein said structural element is suitable or otherwise used in aeronautical construction.

59. A structural element as claimed in claim 38, wherein said structural element is suitable or otherwise used in aeronautical construction.

60. A structural element as claimed in claim 39, wherein said structural element is suitable or otherwise used in aeronautical construction.

61. A structural element as claimed in claim 40, wherein said structural element is suitable or otherwise used in aeronautical construction.

62. A structural element as claimed in claim 41, wherein said structural element is suitable or otherwise used in aeronautical construction.

63. A structural element as claimed in claim 42, wherein said structural element is suitable or otherwise used in aeronautical construction.

64. An aircraft fuselage component comprising a composite laminate sandwich panel according to claim 1.

65. An aircraft door component comprising at least one composite laminate sandwich panel according to claim 1.

66. A composite laminated sandwich panel according to claim 8, wherein the total concentration of said dispersoids does not exceed about 2% based on the weight of the alloy and the concentration of each individual dispersoid element does not exceed about 0.5%.

* * * * *